(12) United States Patent
Jitsuishi et al.

(10) Patent No.: US 7,306,146 B2
(45) Date of Patent: Dec. 11, 2007

(54) MERCHANDISE SALES DATA PROCESSING APPARATUS

(75) Inventors: Hironobu Jitsuishi, Shizuoka (JP); Hirotaka Ichiba, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 169 days.

(21) Appl. No.: 11/236,083

(22) Filed: Sep. 27, 2005

(65) Prior Publication Data

US 2006/0071068 A1 Apr. 6, 2006

(30) Foreign Application Priority Data

Oct. 1, 2004 (JP) ............... 2004-290072

(51) Int. Cl.
*G06K 15/00* (2006.01)
(52) U.S. Cl. .................. 235/383; 235/462.01
(58) Field of Classification Search ............... 235/383, 235/462.01, 378, 381; 186/59, 61
See application file for complete search history.

(56) References Cited

U.S. PATENT DOCUMENTS

| | | | | |
|---|---|---|---|---|
| 4,526,403 A | * | 7/1985 | Park | 283/62 |
| 5,176,224 A | * | 1/1993 | Spector | 186/52 |
| 5,481,094 A | * | 1/1996 | Suda | 705/14 |
| 5,496,116 A | | 3/1996 | Senda | |
| 5,503,483 A | | 4/1996 | Petteruti et al. | |
| 5,557,721 A | | 9/1996 | Fite et al. | |
| 6,062,748 A | * | 5/2000 | Shimizu et al. | 400/70 |
| 6,062,750 A | | 5/2000 | Ueno et al. | |
| 6,282,516 B1 | * | 8/2001 | Giuliani | 705/14 |
| 6,625,579 B1 | * | 9/2003 | Komai | 705/20 |
| 6,876,978 B1 | * | 4/2005 | Walker et al. | 705/26 |
| 6,892,180 B1 | | 5/2005 | Pointeau et al. | |
| 7,188,154 B2 | * | 3/2007 | Minowa | 709/219 |
| 2001/0045459 A1 | * | 11/2001 | Kondo et al. | 235/383 |
| 2002/0046195 A1 | * | 4/2002 | Martin et al. | 705/401 |
| 2002/0185029 A1 | | 12/2002 | Spano | |
| 2004/0112236 A1 | | 6/2004 | Yokoyama et al. | |

FOREIGN PATENT DOCUMENTS

| | | |
|---|---|---|
| EP | 0 627 704 A2 | 12/1994 |
| EP | 0 809 212 A1 | 11/1997 |
| EP | 1 394 753 A1 | 3/2004 |
| JP | 05-250385 A | 9/1993 |
| JP | 2003-132430 A | 5/2003 |
| WO | WO 99/03051 A1 | 1/1999 |

* cited by examiner

*Primary Examiner*—Ahshik Kim
(74) *Attorney, Agent, or Firm*—Frishauf, Holtz, Goodman & Chick, P.C.

(57) ABSTRACT

By a receipt printer for issuing a receipt obtained by printing sales information generated in association with a merchandise sales data process onto a receipt sheet, a stamp receipt is issued, in which a pre-specified number of stamp frames for stamp marks provided to a customer in accordance with a sales amount in the merchandise sales data process are printed onto the receipt sheet.

13 Claims, 9 Drawing Sheets

MERCHANDISE SALES DATA PROCESSING APPARATUS

CROSS REFERENCE TO RELATED APPLICATION

The present application is based on Japanese Priority Document P2004-290072 filed on Oct. 1, 2004, the content of which is incorporated herein by reference.

BACKGROUND OF THE INVENTION

1. Field of the Invention

The present invention relates to a merchandise sales data processing apparatus.

2. Discussion of the Background

Hitherto, some retail shops such as supermarkets and drugstores promote sales by affixing stamps of the number according to a sales amount on a card.

In some cases, a stamp affixed on a card is used as electronic information. For example, Japanese Patent Laid-open No. Hei 5(1993)-250385 discloses a technique of converting provided stamps of the number according to a transaction amount into electronic information and storing the electronic information onto a storing medium such as a magnetic card or an IC card.

Japanese Patent Laid-open No. 2003-132430 discloses a technique of printing a discount ticket (coupon) or adding points to a customer having a specific attribute.

In the case of using, for example, an ECR (Electric Cash Register) as the merchandise sales data processing apparatus, to apply a technique as disclosed in Japanese Patent Laid-open No. Hei 5(1993)-250385, hardware such as a magnetic card reader/writer or an IC card reader/writer for storing a stamp in the form of electronic information onto a storing medium such as a magnetic card or an IC card is necessary. An ECR having the hardware such as an IC card reader/writer is generally a sophisticated machine.

In contrast, under the present circumstances, a merchandise sales data processing apparatus (for example, an ECR) as a popular machine capable of executing a merchandise sales data process which is a minimum process required does not have hardware such as a magnetic card reader/writer or an IC card reader/writer. Therefore, it is difficult to apply the technique disclosed in Japanese Patent Laid-open No. Hei 5-250385 to the popular machine.

SUMMARY OF THE INVENTION

An object of the present invention is to enable a merchandise sales data processing apparatus as a popular machine to easily provide service according to a sales amount.

The merchandise sales data processing apparatus of the invention prints and issues a stamp receipt obtained by printing a preset specific number of stamp frames for stamp marks provided to a customer in accordance with a sales amount in a merchandise sales data process on a receipt sheet by using a receipt printer.

A merchandise sales data processing apparatus of the invention can enter a coupon amount and issue a coupon in landscape obtained by, in accordance with a coupon print issuing declaration, printing coupon information based on the entered coupon amount on a receipt sheet in a state where the coupon information is turned by 90 degrees from a receipt issuing direction by using a receipt printer.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

An embodiment of the invention will be described with reference to FIGS. 1 to 6. In the embodiment, the invention is applied to an ECR as a merchandise sales data processing apparatus.

Figure 1:
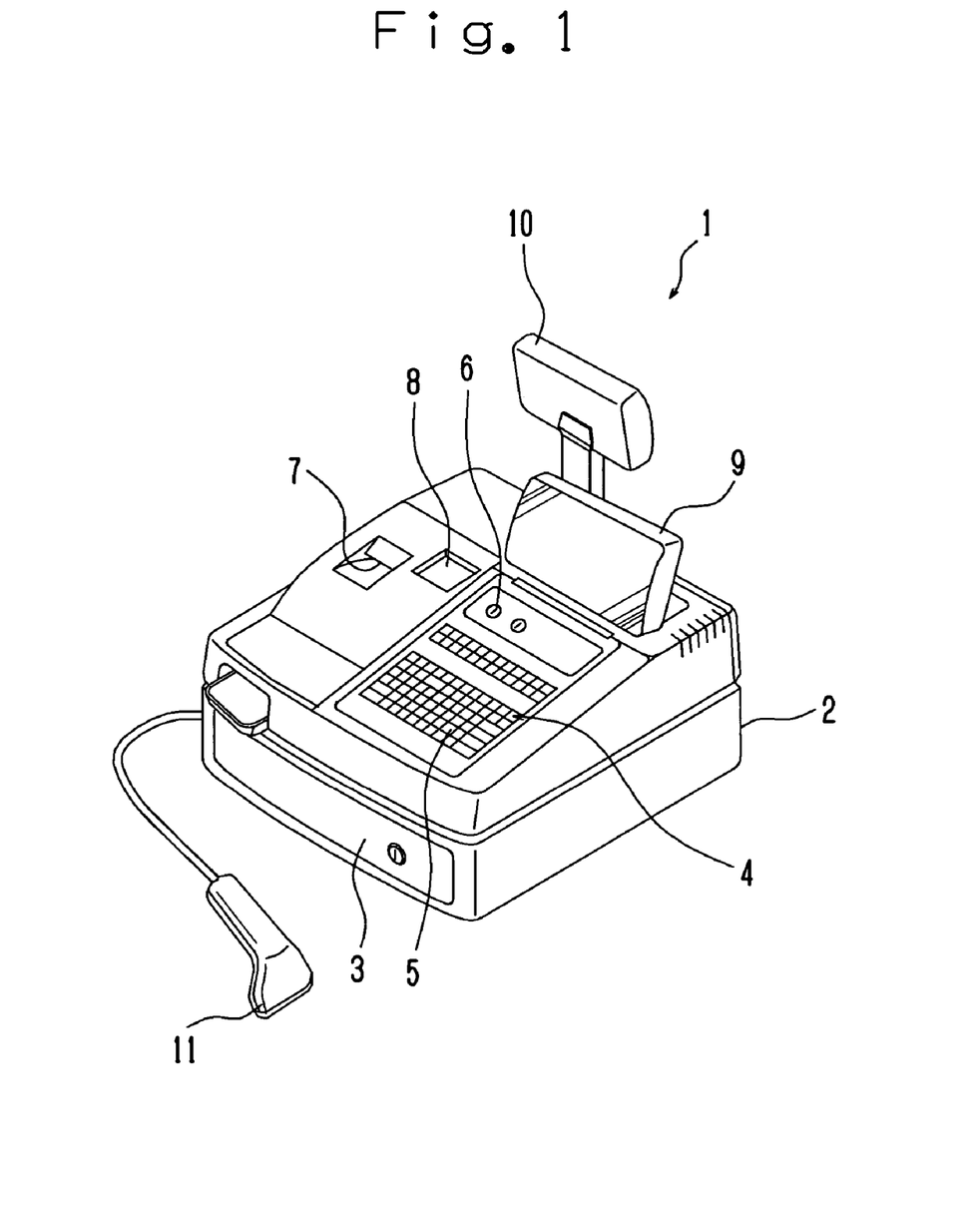
FIG. 1 is an outside perspective view showing an ECR of an embodiment of the invention.

FIG. 1 is an outside perspective view showing an ECR of an embodiment of the invention. An ECR 1 is put on a drawer base 2 and controls opening/closing of a drawer 3 of the drawer base 2. The ECR 1 has an operation area 4 for accepting an operation of the operator on its top face. In the operation area 4, a keyboard 5 as a collection of various keys is provided. The various keys of the keyboard 5 of the embodiment are: numeric keys for entering a merchandise code, amount, the quantity sold, and the like; a "total" key operated on declaration of totaling of cash at the time of executing a merchandise sales data process which will be described later; a "stamp receipt" key operated on declaration of executing a stamp receipt issuing process which will be described later; a "stamp frame" key operated on setting of the number of stamp frames at the time of executing the stamp receipt issuing process which will be described later; and a "stamp addition" key operated when the number of stamps to be printed is entered at the time of executing the stamp receipt issuing process which will be described later (the keys are not shown). In the embodiment, the keyboard 5 is a component of an input device for inputting merchandise information.

In the operation area 4, a control key 6 switched by a not shown key, a receipt issuing port 7 for discharging a receipt and a stamp receipt which will be described later (refer to FIG. 5), and a journal window 8 are provided. When seen from the operator, the keyboard 5 and the control key 6 are disposed in the right-side area, and the receipt issuing port 7 and the journal window 8 are disposed in the left-side area.

In a right upper part of the ECR 1, a display 9 functioning as a display on the operator side is disposed. Near the display 9, a display unit 10 functioning as a display for the customer (purchase) is provided upright.

To the ECR 1, a bar code scanner 11 for optically reading a bar code such as a merchandise code is connected. In the embodiment, the input device is constructed by the bar code scanner 11 together with the keyboard 5.

Figure 2:
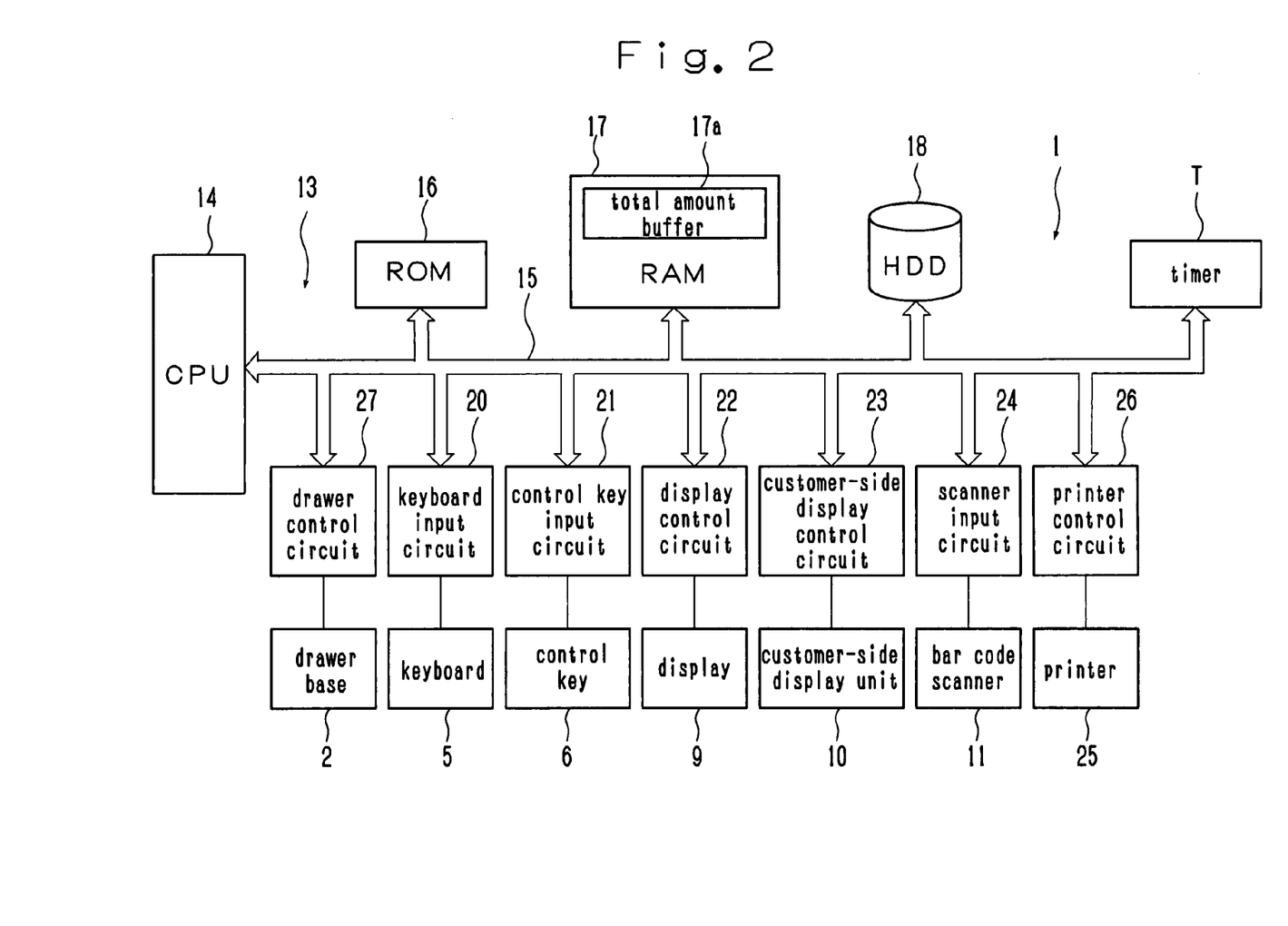
FIG. 2 is a block diagram showing electric connections of components provided in the ECR.

FIG. 2 is a block diagram showing electric connections of components provided in the ECR 1. The ECR 1 has therein a microcomputer 13 which controls the components. The microcomputer 13 is constructed by connecting a ROM (Read Only Memory) 16 for pre-storing fixed data such as a start program, a RAM (Random Access Memory) 17 serving as various buffers such as a sales buffer and a print buffer and functioning as a work area for storing various data to be rewritable, and a timer T, to a CPU (Central Processing Unit) 14 for controlling the components in a centralized manner via a bus line 15 such as an address bus and a data bus. The RAM 17 is backed up by a battery (not shown).

A total amount buffer 17a for storing a sales total amount in a merchandise sales data process which will be described later is assured in the RAM 17. In the total amount buffer 17a, a sales total amount in a merchandise sales process performed just before execution of a stamp receipt issuing process which will be described later is stored in an updatable state, and is updated each time the merchandise sales process is executed newly. In the RAM 17, a not-shown buffer is assured, that stores a stamp issue amount, the specified number of stamp frames, the number of stamps issued, and the like which are referred to at the time of the stamp receipt issuing process to be described later.

Figure 5:
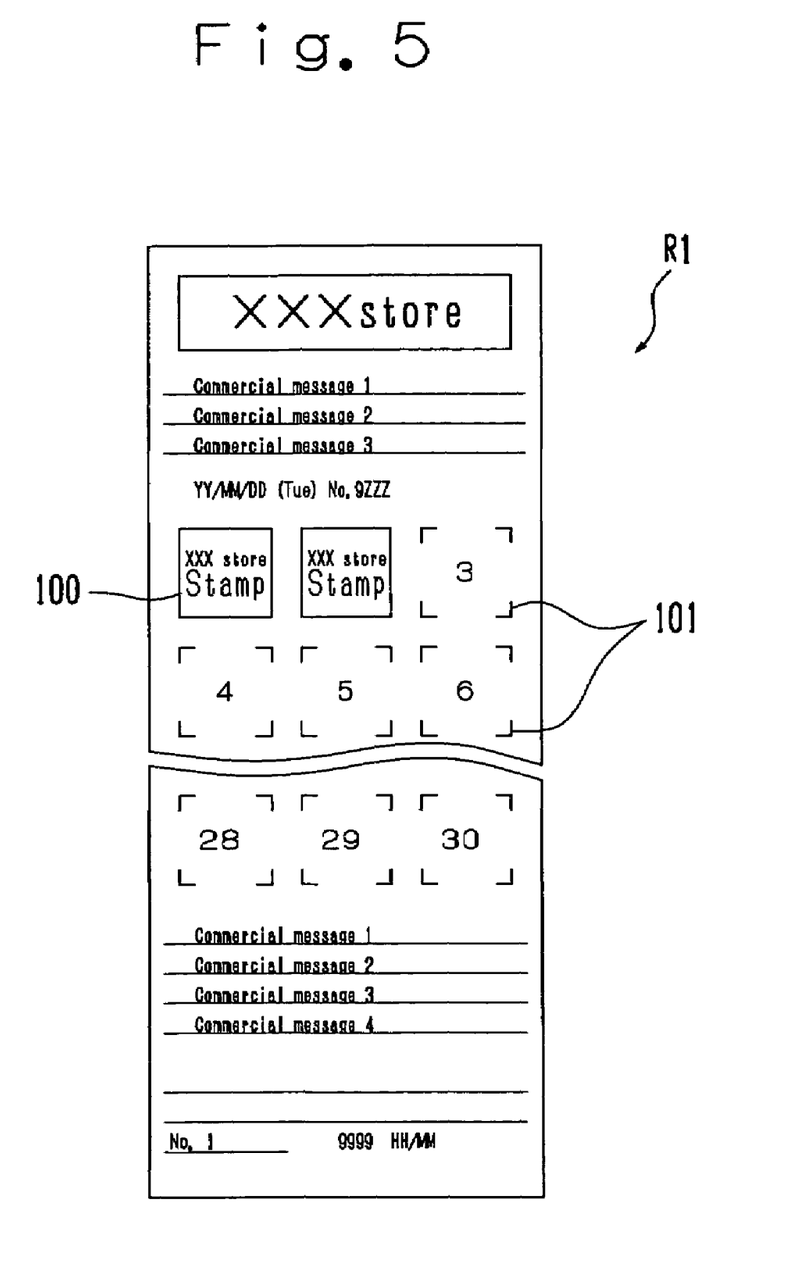
FIG. 5 is a front view of a stamp receipt.

The stamp issue amount is data specifying a sales amount required to print a stamp mark 100 (refer to FIG. 5). At the time of performing the stamp receipt issuing process which will be described later, stamp marks 100 of the number corresponding to a preset stamp issue amount are printed. For example, in the case where the stamp issue amount is set as 500 yen, if the sales amount is 700 yen, one stamp mark 100 is printed. If the sales amount is 1,000 yen, two stamp marks 100 are printed. The setting of the stamp issue amount is changeable.

The number of specified stamp frames is the number which specifies the number of stamp marks 100 required for a customer to get a privilege such as exchange with a gift or predetermined discount. The "preliminarily specified number" is specified by the specified number of stamp frames. In the embodiment, setting of the number of stamp frames is changeable. The details will be described later.

The number of stamps issued is the number obtained by adding the number of stamp marks 100 generated in the merchandise sales data process corresponding to the stamp receipt issuing process of this time and the number of stamp marks 100 which have already printed to the customer (consumer).

An HDD (Hard Disk Drive) 18 is connected to the bus line 15 connected to the CPU 14. Although not shown, a control program for operating the microcomputer 13, a merchandise master file, a sales file for storing sales record information related to the merchandise sales data process which will be described later, and the like are stored in the HDD 18. The sales file temporarily stores sales data such as a classification code, unit price, quantity, merchandise name, and discount rate so as to be associated with a merchandise code.

The keyboard 5 is connected to the bus line 15 via a keyboard input circuit 20, and inputs a signal according to a key operated by the operation on the keyboard input circuit 20 into the microcomputer 13.

The control key 6 is connected to the bus line 15 via a control key input circuit 21, and inputs a signal according to a switch position by the operation on the control key input circuit 21 to the microcomputer 13. The microcomputer 13 sets the operation mode of a POS terminal 1 to any of work modes such as a registration mode, a setting mode, an adjustment mode, an inspection mode, and the like in accordance with an output signal of the control key 6.

The display 9 is connected to the bus line 15 via a display control circuit 22. When display data from the microcomputer 13 is input to the display control circuit 22, the display 9 is driven by the display control circuit 22 to display a predetermined article.

The customer-side display unit 10 is connected to the bus line 15 via a customer-side display control circuit 23. When customer-side display data from the microcomputer 13 is input to the customer-side display control circuit 23, the customer-side display unit 10 is driven by the customer-side display control circuit 23 and displays a predetermined article.

The bar code scanner 11 is connected to the bus line 15 via a scanner input circuit 24, and transmits data of a merchandise code read by operation of the scanner input circuit 24 to the microcomputer 13.

The POS terminal 1 has therein a printer 25 as a receipt printer controlled by the microcomputer 13. The printer 25 is connected to the bus line 15 via a printer control circuit 26. When print data from the microcomputer 13 is input to the printer control circuit 26, the printer 25 is driven by the printer control circuit 26 to print a predetermined item on a receipt sheet or a journal sheet. Further, the printer 25 has therein a not-shown cutter. The cutter is driven by the microcomputer 13 and cuts the receipt sheet in a predetermined position. As a result, the printer 25 displays the function of printing a receipt (not shown), a stamp receipt R1 (refer to FIG. 5), and the like.

In addition, the drawer base 2 provided separately from the POS terminal 1 is also controlled by the microcomputer 13. The drawer base 2 is connected to the bus line 15 via a drawer control circuit 27. In accordance with an open signal from the microcomputer 13, the drawer control circuit 27 is driven to open the drawer 3 of the drawer base 2.

Figure 3:
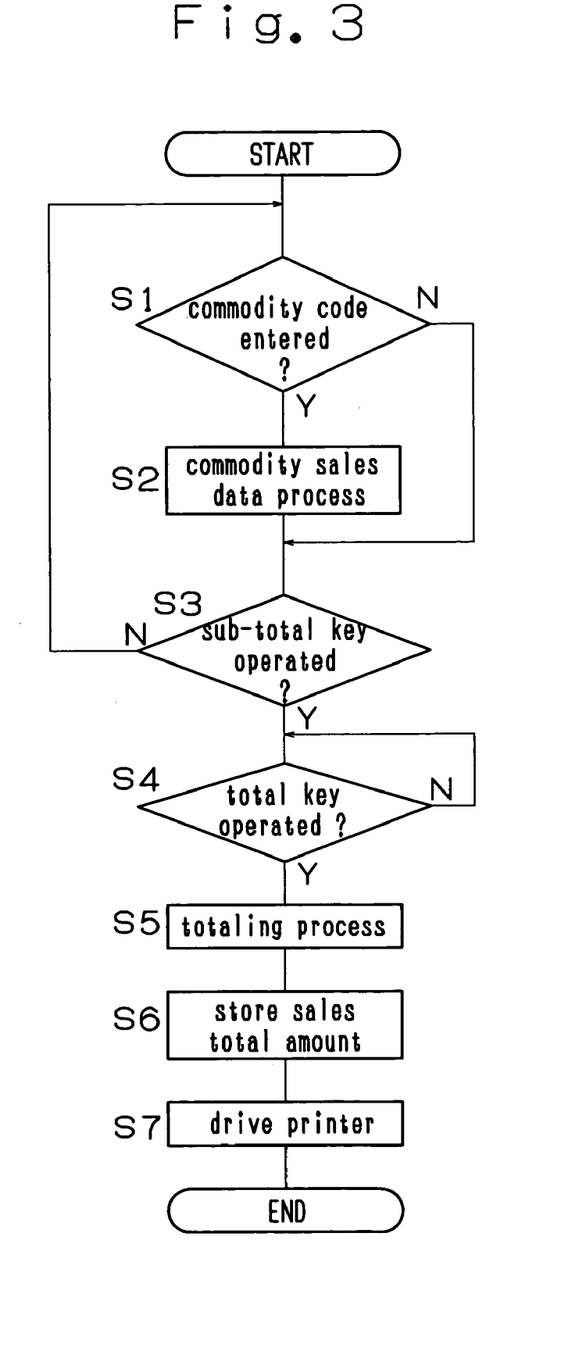
FIG. 3 is a flowchart schematically showing a merchandise sales process executed by a microcomputer on the basis of a control program stored in an HDD.

FIG. 3 is a flowchart schematically showing the merchandise sales process executed by the microcomputer 13 on the basis of the control program stored in the HDD 18. The merchandise sales process shown in FIG. 3 is executed in the case where the register mode is set as the operation mode of the ECR 1 by an operation on the control key 6.

The merchandise sales process stands by until entry of a merchandise code is determined (N in step S1). When entry of a merchandise code is determined (Y in step S1), the merchandise sales data process is executed (step S2) until it is determined that a "sub-total" key is operated by an operation on the keyboard 5 (N in step S3).

Entry of the merchandise code in step S1 is performed by reading the merchandise code by the bar code scanner 11 or an operation on the numeric keys of the keyboard 5.

In the merchandise sales data process executed in step S2, a merchandise master file MF is searched on the basis of the entered merchandise code for merchandise information 104 corresponding to the entered merchandise code. The sales data based on the obtained merchandise information 104 is stored in a sales buffer in the RAM 17, and a sub-total amount 130 until then is calculated. Information such as a unit price 102 or the sub-total amount 130 is displayed on the display 9 or the display unit 10.

In the case where it is determined that the "sub-total" key is operated by an operation on the keyboard 5 (Y in step S3), the microcomputer 13 waits for an operation on the "total"

key by an operation on the keyboard 5 (N in step S4). When it is determined that the "total" key is operated by an operation on the keyboard 5 (N in step S4), a totaling process is executed (step S5).

In the totaling process executed in step S5, print data constructed by sales data, sales total amount, and the like stored in the sales buffer is generated and developed to the print buffer, or the sales data stored in the sales buffer and the like is stored in the sales file in the HDD 18. A change amount or the like is calculated on the basis of the sales total amount calculated on the basis of the sales data and displayed on the display 9 or the display unit 10, and the drawer 3 of the drawer base 2 is released.

Subsequently, the sales total amount calculated on the basis of the totaling process in step S5 is stored in the total amount buffer 17a in the RAM 17 (step S6), print data is generated on the basis of the sales registering process in steps S and S2, and the printer 25 is driven to print a receipt on the basis of the generated print data (step S7). The receipt printed in step S7 is a general receipt, so that it is not shown and described here.

Figure 4:
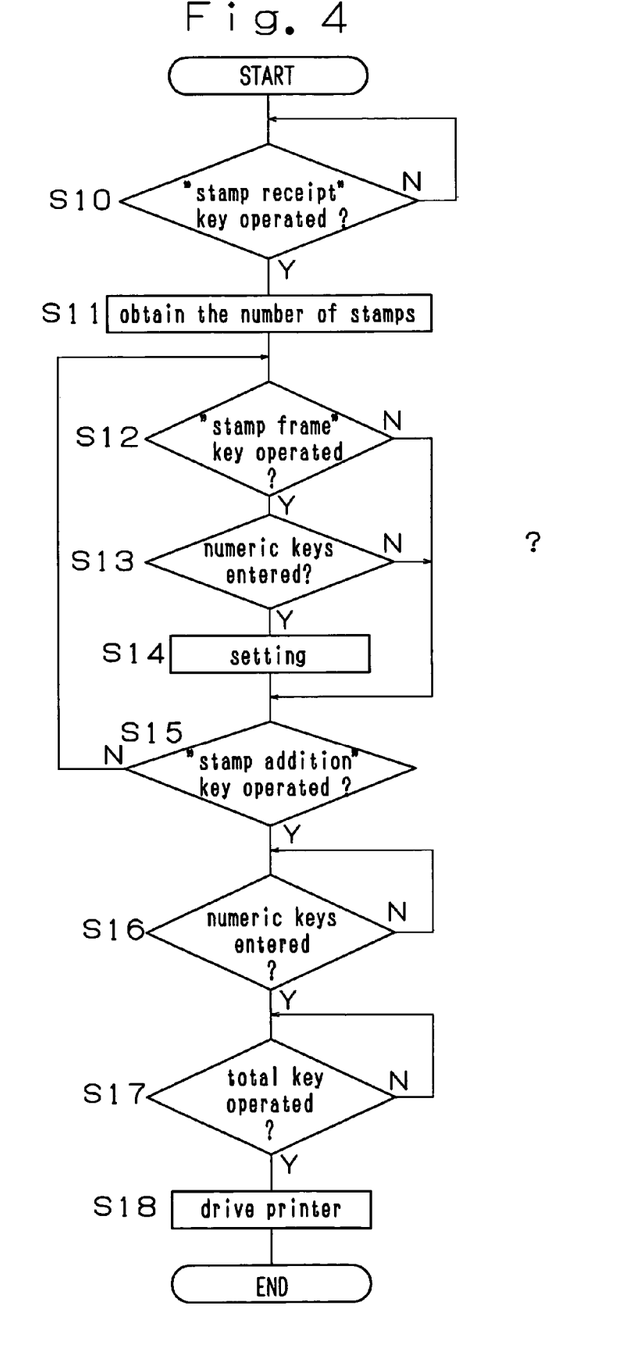
FIG. 4 is a flowchart schematically showing a stamp receipt issuing process executed by the microcomputer on the basis of the control program stored in the HDD.

FIG. 4 is flowchart schematically showing the stamp receipt issuing process executed by the microcomputer 13 on the basis of the control program stored in the HDD 18. The stamp receipt issuing process shown in FIG. 4 corresponds as one stamp receipt issuing process to one merchandise sales process as shown in FIG. 3 in a one-to-one corresponding manner and is executed during the period since one merchandise sales process is finished until the next merchandise sales process starts.

The stamp receipt issuing process is not performed until it is determined that the "stamp receipt" key is operated by operation on the keyboard 5 (N in step S10). When it is determined that the "stamp receipt" key is operated by operation on the keyboard 5 (Y in step S10), the stamp marks 100 of the number according to the sales amount in the merchandise sales process executed just before it is determined the "stamp receipt" key is operated are obtained (step S11).

Subsequently, the microcomputer 13 waits until it is determined that the "stamp frame" key is operated by operation on the keyboard 5 or until it is determined that the "stamp addition" key is operated by operation on the keyboard 5 (N in step S12 and N in step S15).

The operator operates the "stamp frame" key by operating the keyboard 5 and, after that, enters the specified number of stamp frames by operating the keyboard 5 (numeric keys).

When it is determined that the "stamp frame" key is operated (Y in step S12), the microcomputer 13 waits for an entry of the specified number of stamp frames by operation on the keyboard 5 (numeric keys) (N in step S13). When the specified number of stamp frames is entered by operating the keyboard 5 (numeric keys) (Y in step S13), the entered specified number of stamp frames is stored in the buffer in the RAM 17 (step S14).

In the embodiment, after the operation on the "stamp frame" key, the operator can arbitrarily set the specified number of stamp frames by entering an arbitrary numeric value. Consequently, in operation, also in the case where the specified number of stamp frames in a certain period to, for example, 10, the specified number of stamp frames in another period can be set to, for example, 30.

As another embodiment, the specified number of stamp frames may be entered for every stamp receipt issuing process or newly entered when setting of the specified number of stamp frames is changed. In the case of newly entering the specified number of stamp frames when the setting of the specified number of stamp frames is changed, when there is no change in the setting of the specified number of stamp frames, the setting of the last time may be maintained by omitting an operation of the "stamp frame" key or by operating the "stamp addition" key if the "stamp frame" key is operated. In such a case, the specified number of stamp frames is stored not in a buffer but in a predetermined memory which is preliminarily assured so that the specified number of stamp frames is not erased even in the case where a merchandise sales process is performed and, after that, another merchandise sales process is performed.

The operator operates the "stamp addition" key by operating the keyboard 5 and, after that, enters the number of issued stamps by operating the keyboard 5 (numeric keys).

In the case where it is determined that the "stamp addition" key is operated (Y in step S15), the microcomputer 13 waits for an entry of the number of issued stamps by operation on the keyboard 5 (numeric keys) (N in step S16). When the number of issued stamps is entered by operation on the keyboard 5 (numeric keys) (Y in step S16), the microcomputer 13 waits until it is determined that the "total" key is operated by operation on the keyboard 5 (N in step S17).

As described above, the number of issued stamps is a number obtained by totaling the number of stamp marks 100 generated in the merchandise sales data process corresponding to the stamp receipt issuing process of this time and the number of stamp marks 100 already printed to the customer (consumer). Consequently, in operation, a stamp receipt already printed has to be collected from the customer as a thing certifying the number of stamp marks 100 printed before the stamp receipt issuing process of this time. For example, in the case where the number of stamp marks 100 (the number of issued stamps) printed before the stamp receipt process of this time is "3", the operator operates the "stamp addition" key, after that, enters "3", and operates the "total" key to declare determination of the entered number of stamps issued. It is assumed that, in the stamp receipt issuing process of the first time, the operator operates the "stamp addition" key, enters "0", and operates the "total" key.

In the case where it is determined that the "total" key is operated by operation on the keyboard 5 (Y in step S17), the printer is driven on the basis of the specified number of stamp frames set in the buffer, the number of added stamps, and the number of stamp marks 100 generated this time to issue the stamp receipt R1 as shown in FIG. 5 (step S18). In the stamp receipt R1, as shown in FIG. 5, the stamp marks 100 provided according to the sales amount in the merchandise sales data process and stamp frames 101 for guiding the arrangement positions of the stamp marks 100 to be provided in the subsequent transactions are printed. A preliminarily specified number of the stamp frames 101, that is, the specified number of print frames are printed.

In the embodiment, the stamp receipt R1 on which the stamp marks 100 of the number generated according to the sales amount in the merchandise sales data process is issued. Alternately, a stamp receipt R2 (refer to FIG. 6) on which no stamp marks 100 are printed but only the stamp frames 101 are printed can be issued. By issuing the stamp receipt R2 on which only the stamp frames 101 are printed, stamp service of affixing stamps by manual work can be provided.

Figure 6:
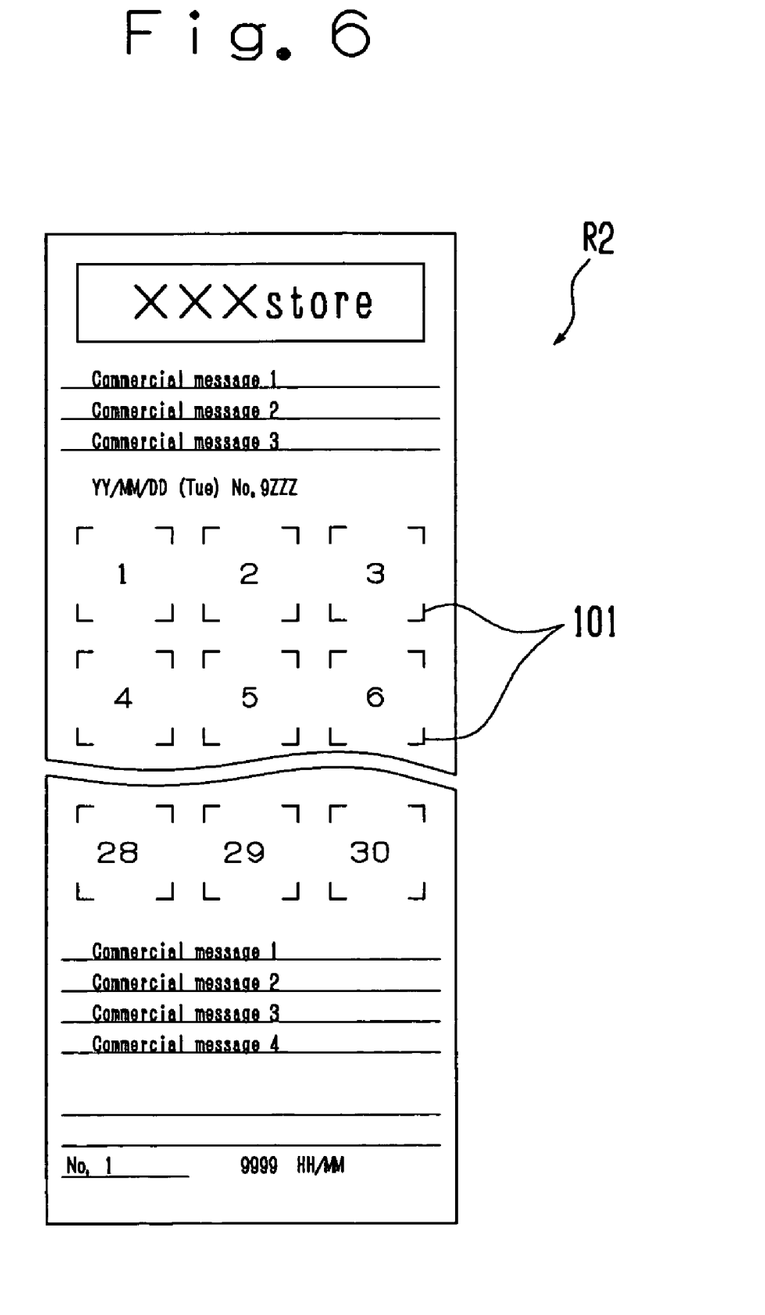
FIG. 6 is a front view of another stamp receipt.

As described above, according to the embodiment, the ECR 1 as the merchandise sales data processing apparatus as a popular machine can easily print and issue the stamp receipts R1 and R2. Therefore, a retail shop using the ECR 1 as a popular machine can also provide stamp service according to the sales amount and can promote sales.

Since the ECR 1 as the merchandise sales data processing apparatus of the embodiment prints the stamp frames 101 in addition to the stamp marks 100 in the single stamp receipt R1, the user can visually recognize the proportion of the issued stamp marks 100 in the whole. Consequently, information indicating how many stamp marks 100 to collect, that is, how much to buy in order to get the gift can be easily passed. It stimulates consumers' purchasing inclinations and the sales can be further promoted.

Although the stamp marks 100 of one kind are printed in the stamp receipt R1 shown in FIG. 5, for example, in the case where it is determined in step S15 in FIG. 4 that the "stamp addition" key is operated, a stamp receipt (not shown) may be issued on which the stamp marks 100 of the stamp issue number entered by operation on the keyboard 5 (numeric keys) and the stamp marks 100 of the number provided in the immediately preceding merchandise sales process are printed in different forms.

By issuing such a stamp receipt, the number of stamp marks generated in the merchandise sales process of this time can be notified to the customer (consumer). In addition, the customer can check whether the number of stamp marks 100 already issued are printed correctly on a stamp receipt of this time or not. Thus, an effect of improving the reliability of the shop from the customer (consumer) is expected.

Figure 7:
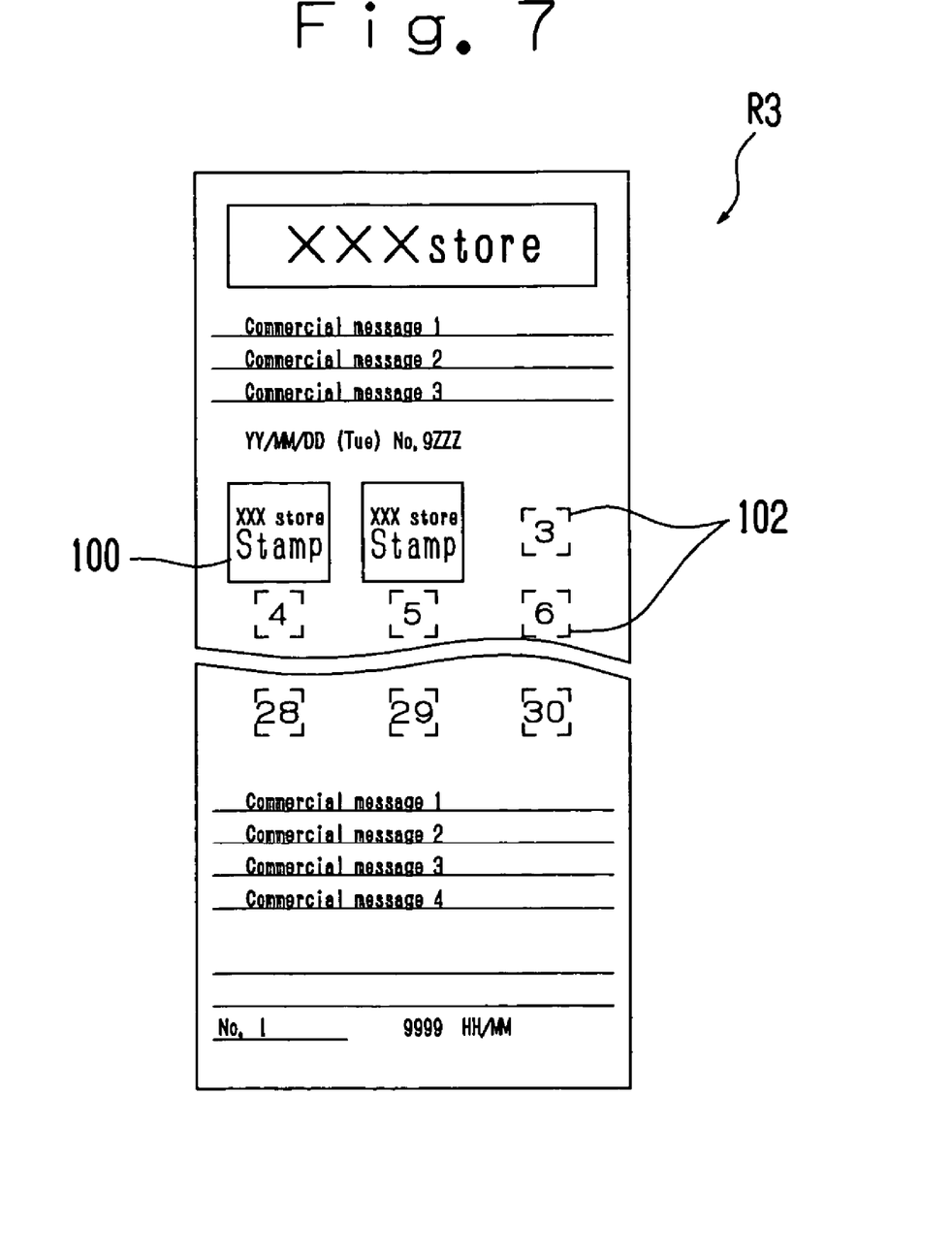
FIG. 7 is a front view of a stamp receipt in another embodiment of the invention.

Another embodiment of the invention will now be described with reference to FIG. 7. The same parts as those of the foregoing embodiment are designated with the same reference numerals and their description will not be repeated.

In the embodiment, in step S18 in FIG. 4, printing is performed while setting the size of the stamp frame 102 to be smaller than that of the stamp mark 100. As shown in FIG. 7, a stamp receipt R3 on which stamp frames 102 each having a size smaller than that of the stamp mark 100 are printed is issued.

Consequently, the length of the stamp receipt R3 is made shorter than that of the stamp receipt R1 on which the stamp frames 101 each having the same size as that of the stamp mark 100 are printed, and consumption of the receipt sheet can be decreased. Thus, while allowing the proportion of the stamp marks 100 in the whole to be visually recognized, reduction in the consumption amount of the receipt sheet can be realized.

Another embodiment of the invention will now be described with reference to FIGS. 8 and 9. The same parts as those of the foregoing embodiment are designated with the same reference numerals and their description will not be repeated. Although not shown, the keyboard 5 of the embodiment has a "coupon issue" key that declares issuance of a coupon ticket C as shown in FIG. 8 when operated.

Figure 9:
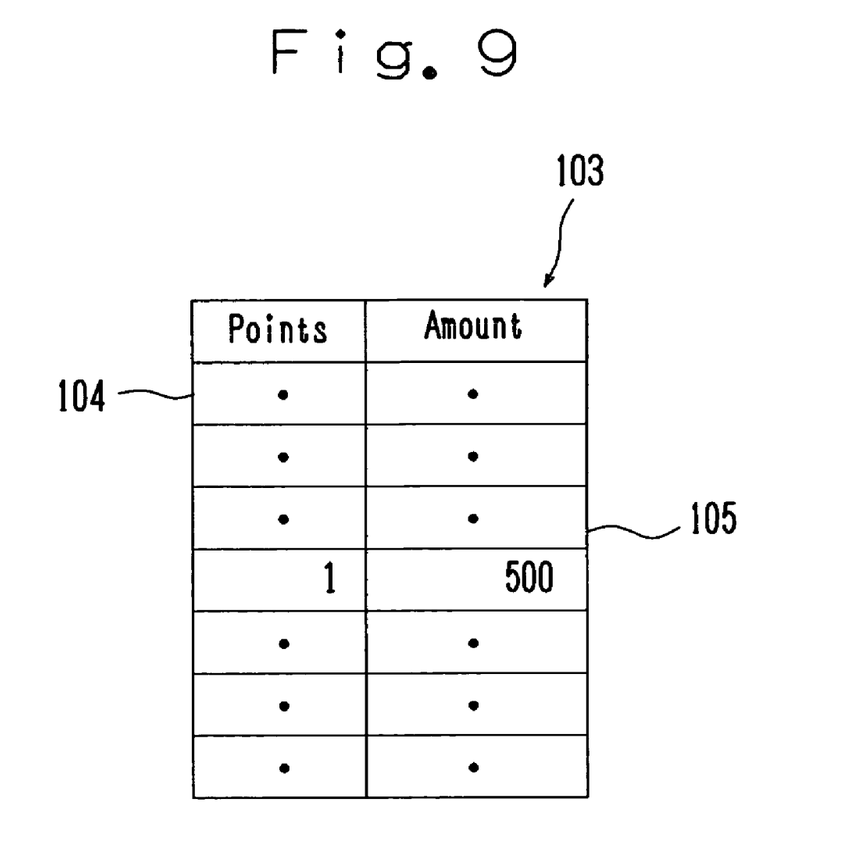
FIG. 9 is a schematic diagram showing a coupon issue file.

In the HDD 18 in the embodiment, a coupon issue file 103 as shown in FIG. 9 is stored. In the coupon issue file 103, an area 104 for storing the points of the coupon ticket C printed and issued in a transaction and an area 105 for storing the amount of the coupon ticket C printed and issued are assured. In the coupon issue file 103, each time the coupon ticket C is printed and issued when the merchandise sales data process is executed, the points of the coupon C printed and issued and the amount of the coupon ticket C printed and issued are written.

In the ECR 1 of the embodiment, when the "coupon issue" key is operated in a state where the coupon amount is entered by the operation on the keyboard 5 by the operator, the coupon ticket C of the entered amount can be issued.

Figure 8:
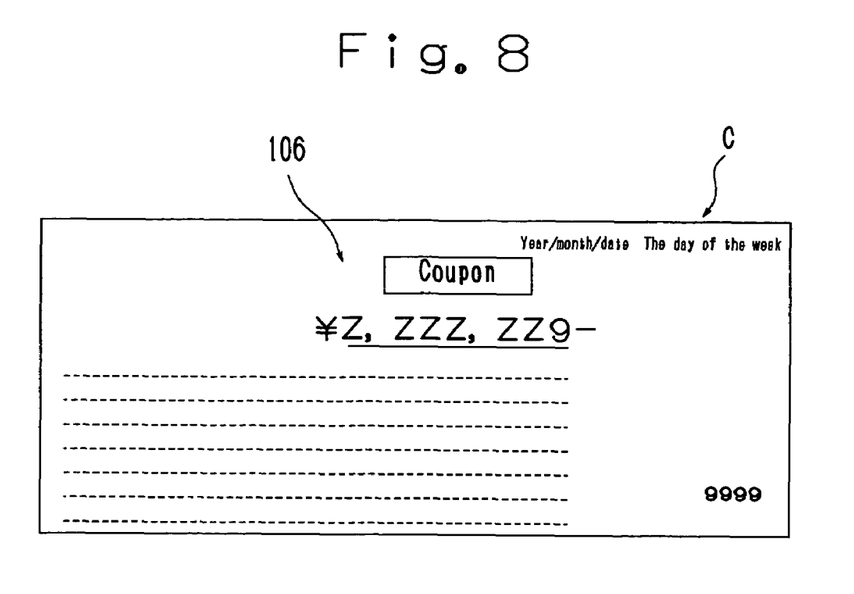
FIG. 8 is a front view of a coupon in another embodiment of the invention.

On the coupon ticket, as shown in FIG. 8, coupon information 106 such as the entered coupon amount is printed. The coupon ticket C is issued by printing the coupon information 106 in a state where the coupon information 106 is turned by 90 degrees from the receipt issue direction.

As described above, according to the embodiment, also the ECR 1 as a popular merchandise sales data processing apparatus can easily print and issue the coupon ticket C. Consequently, a retail shop using the ECR 1 as a popular machine can easily provide service according to a sales amount, and sales can be promoted.

By using the landscape coupon ticket C on which the coupon information 106 is printed in a state where the coupon information 106 is turned from the receipt issue direction by 90 degrees, visibility of the printed information is made excellent. By clarifying the difference between a coupon and a receipt, the coupon can be prevented from being discarded by mistake.

In the embodiment, the merchandise sales data processing apparatus is described as the ECR 1 having the function of printing and issuing the stamp receipts R1, R2, and R3 and the function of printing and issuing the coupon ticket C. However, the invention is not limited to the embodiment. The merchandise sales data processing apparatus of the invention can be also carried out as an ECR which does not have the function of printing and issuing the stamp receipts R1, R2, and R3 but has only the function of printing and issuing the coupon ticket C.

Obviously, numerous modifications and variations of the present invention are possible in light of the above teachings. It is therefore to be understood that within the scope of the appended claims, the invention may be practiced otherwise than as specifically described herein.

What is claimed is:

1. A merchandise sales data processing apparatus, comprising:
    an input device for inputting merchandise information;
    a receipt printer;
    means for performing a merchandise sales data process based on the inputted merchandise information;
    means for controlling the receipt printer to print sales information generated in association with the merchandise sales data process onto a receipt sheet and to issue the receipt sheet with the sales information printed thereon; and
    means for controlling the receipt printer to print a preliminarily specified number of stamp frames for stamp marks, which are to be provided to a customer in accordance with a sales amount in the merchandise sales data process, onto a receipt sheet and to issue the receipt sheet with the stamp frames printed thereon;
    wherein a quantity of stamp marks based on the sales amount in the merchandise sales data process is printed in place of a corresponding quantity of the stamp frames.

2. The merchandise sales data processing apparatus according to claim 1, wherein the specified number of stamp frames is changeable.

3. The merchandise sales data processing apparatus according to claim 1, wherein a second quantity of stamp marks, which is input via the input device, is printed in place of a corresponding second quantity of the stamp frames.

4. The merchandise sales data processing apparatus according to claim 3, wherein the stamp mark is printed in such a manner that a size of the stamp frame is smaller than a size of the stamp mark.

5. The merchandise sales data processing apparatus according to claim 1, wherein the stamp mark is printed in such a manner that a size of the stamp frame is smaller than a size of the stamp mark.

6. The merchandise sales data processing apparatus according to claim 2, wherein the stamp mark is printed in such a manner that a size of the stamp frame is smaller than a size of the stamp mark.

7. A merchandise sales data processing apparatus, comprising:
an input device for inputting merchandise information;
a receipt printer;
means for performing a merchandise sales data process based on the inputted merchandise information;
means for controlling the receipt printer to print sales information generated in association with the merchandise sales data process onto a receipt sheet and to issue the receipt sheet with the sales information printed thereon; and
means for controlling the receipt printer to print a preliminarily specified number of stamp frames for stamp marks, which are to be provided to a customer in accordance with a sales amount in the merchandise sales data process, onto a receipt sheet and to issue the receipt sheet with the stamp frames printed thereon; wherein the specified number of stamp frames is changeable.

8. The merchandise sales data processing apparatus according to claim 7, wherein a quantity of stamp marks based on the sales amount in the merchandise sales data process is printed in place of a corresponding quantity of the stamp frames.

9. The merchandise sales data processing apparatus according to claim 8, wherein a second quantity of stamp marks, which is input via the input device, is printed in place of a corresponding second quantity of the stamp frames.

10. The merchandise sales data processing apparatus according to claim 9, wherein the stamp mark is printed in such a manner that a size of the stamp frame is smaller than a size of the stamp mark.

11. The merchandise sales data processing apparatus according to claim 7, wherein a quantity of stamp marks, which is input via the input device, is printed in place of a corresponding quantity of the stamp frames.

12. The merchandise sales data processing apparatus according to claim 11, wherein the stamp mark is printed in such a manner that a size of the stamp frame is smaller than a size of the stamp mark.

13. The merchandise sales data processing apparatus according to claim 7, wherein the stamp mark is printed in such a manner that a size of the stamp frame is smaller than a size of the stamp mark.

* * * * *